May 28, 1957  J. T. MARVIN  2,793,427

FRICTION MATERIAL

Filed April 6, 1956

INVENTOR.

2,793,427
FRICTION MATERIAL

John T. Marvin, Xenia, Ohio, assignor to General Motors Corporation, Detroit, Mich., a corporation of Delaware Application April 6, 1956, Serial No. 576,736

7 Claims. (Cl. 29—420.5)

This invention relates to friction materials and is particularly concerned with a method for making semi-cylindrical brake linings including a sintered friction layer that is normally brittle.

It is, therefore, the main object of the invention to provide a method for making a friction member comprising a rather brittle sintered friction layer bonded to a strong metal supporting back wherein the member is semi-cylindrical in the final form.

In carrying out this object, it is a further object of the invention to provide a method for briquetting powdered material used in the manufacture of the friction layer in a flat layer and then, after sintering, bending of the material without fracturing the same.

The above objects are accomplished by providing a method wherein the powdered material is briquetted directly onto a strong metal backing strip in the relatively flat condition with simultaneous scoring of the briquetted material laterally of the strip to produce a plurality of substantially disconnected portions along the strip, sintering the briquetted material upon the strip to form a sintered porous metal layer coextensively bonded to the strip and finally bending the strip to an arcuate form whereby the sintered material conforms to the shape of the strong metal strip without fracturing of the bond.

Further objects and advantages of the present invention will be apparent from the following description, reference being had to the accompanying drawings, wherein preferred embodiments of the invention are clearly shown.

In the manufacture of friction materials, for example, clutches and brakes, it is frequently desirable to use the material in band form. These bands are preferably arcuate or semi-cylindrical in shape so as to fit around a drum whereby upon tightening of the band the friction material on the arcuate friction member drags against the drum to absorb energy, if used as a brake, or to cause relative rotation of the drum with the band carrying member in the case of a clutch.

Nonmetallic friction materials have been used for this purpose, for example, molded and woven clutch and brake lining materials which are riveted or cemented directly to the arcuate metal band.

In application, Serial No. 540,842, assigned to the assignee of the present invention, a new type of friction material is disclosed which comprises an iron-graphite-molybdenum disulfide mixture. This material is sintered and may be termed a metallic friction material as differentiated from the molded and woven nonmetallic materials. This metallic friction material has numerous advantages, principal among which is the ability to wear over long periods of time and produce uniform friction characteristics under varying conditions throughout the span of its life. The material has one drawback when compared to nonmetallic materials, namely, it is rather brittle in the sintered condition due to the high quantities of graphite included therein. Thus, it is difficult to form the bands when the material is sintered and bonded on a steel backing member which is the conventional procedure. The material may be briquetted onto an arcuate steel backing strip but this is difficult to accomplish and entails expensive briquetting techniques. For this reason, it is highly desirable to briquette the powdered materials of the lining directly onto a steel strip in the flat condition and then, after sintering, bend the steel strip with the lining therein, to the desired arcuate shape. As heretofore mentioned, the brittle nature of the material causes it to crack when this bending operation is carried out, which sometimes causes bond failure.

This invention is directed to a method for making brake or clutch bands involving the use of the hereindisclosed brittle friction material or any other metallic friction material wherein the band may be fabricated in the flat form and subsequently bent up to arcuate shape without having any deleterious results on the linings.

Figure 1:
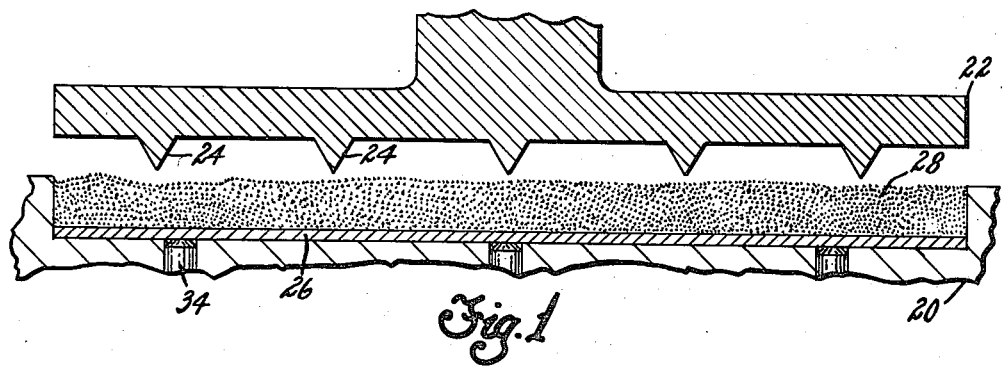
Figure 1 is a fragmentary sectional view of a punch and die member showing powdered material in loose form upon a strong metal backing strip in the die.
Figure 2:
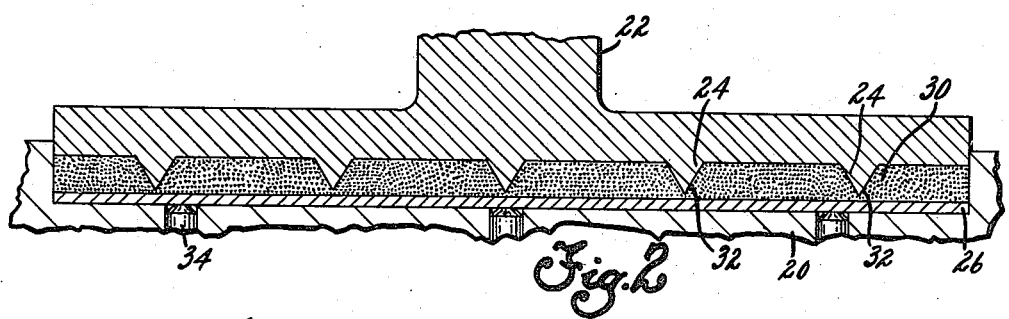
Figure 2 is a view similar to Figure 1 wherein the punch has briquetted the powdered material onto the supporting member within the die.

Specifically referring to the drawings, Figure 1 shows a die member 20 and a cooperating punch 22 used in the manufacture of a friction element. The punch 22 includes a plurality of spaced laterally disposed ribs 24 therealong. In the manufacture of the element, a strong metal strip 26 such as a steel strip is placed in the bottom of the die 20 and powdered materials 28 used in the lining are filled in measured quantities into the die cavity thereover. The punch 22 is then forced into the die 20 as shown in Figure 2 whereupon the powdered materials 28 are compressed into a briquetted layer 30 which includes spaced grooves 32 transversely thereof throughout its length as formed by the ribs 24.

The specific briquetting pressures, etc., are well known in the art and such pressures may vary from 20,000 to 80,000 pounds per square inch. It is preferred to prepare the surface of the steel strip for the metal powder of the friction layer by first cleaning the surface of the steel and then flash coating the same with copper. Next a matrix layer is sintered onto the surface of the steel. This matrix layer is relatively thin and is highly porous and is made by distributing a mixture of copper-tin, copper-nickel or other suitable powders in a substantially non-compacted layer on the surface of steel and sintering this layer under non-oxidizing conditions to produce a highly porous metal layer which is bonded directly to the surface of the steel. Procedures for preparing such a porous layer are clearly disclosed in Koehring Patents 2,198,253 and 2,198,254. After this highly porous layer is attached to the steel, it forms a mechanical bond with the ingredients of the friction layer which actually are forced, during the briquetting operation, into the pores of the highly porous metal layer which causes the friction layer to become interlocked to the steel through the medium of the highly porous metal layer. Attachment of a rather dense porous metal layer to a steel backing through an intermediate highly porous metal layer is shown in Patent 2,251,410, which describes the processing in more detail.

Figure 3:
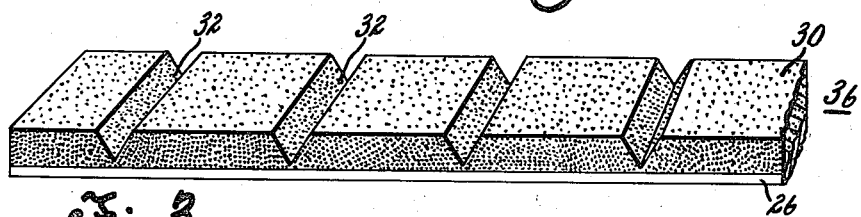
Figure 3 is a view in perspective of the friction material in briquetted form upon the supporting strip.

After the powdered material 28 has been compressed into layer 30 in the strip 26, the punch 22 is retracted and the steel strip 26 with the compressed layer 30 briquetted thereon is ejected from the die through the use of ejecting pins 34 or other suitable means. The element which comes from the die is seen in Figure 3 at 36 and comprises the steel strip or backing member 26 wherein a compressed metal layer 30 is adhered thereto which includes a plurality of transverse grooves 32 therealong. It is preferable that the grooves 32 extend substantially to the surface of the steel strip 26 for reasons hereinafter set forth.

The element 36 is next sintered under non-oxidizing or reducing conditions, as is well known in the art, for a period ranging from twenty minutes to an hour at a temperature below the melting point of the major constituent of the material in the powdered layer. For example, as the layer is predominantly iron, as set forth in the heretofore mentioned application, Serial No. 540,842, sintering is preferably carried out for about forty minutes at 2050° F. If the material of layer 30 is predominantly copper, for example, if said layer is a copper-tin-lead-graphite material as disclosed in Wellman Patent 2,178,527. A sintering temperature in the order of 1550° F. to 1700° F. is preferred for a period of about forty minutes. All of these times and temperatures are well known in the art for the specific material being sintered and form no part of this invention.

In some instances, it may be desirable to eliminate the intermediate highly porous metal layer in which case the metal powder of the friction layer may be briquetted directly onto the prepared surface of a steel strip after which the sintering under similar conditions is carried out. In this instance, however, the sintering should be accomplished under pressure as disclosed in the Wellman patent above referred to so that the briquetted layer does not tend to separate from the steel during sintering.

Figure 4:
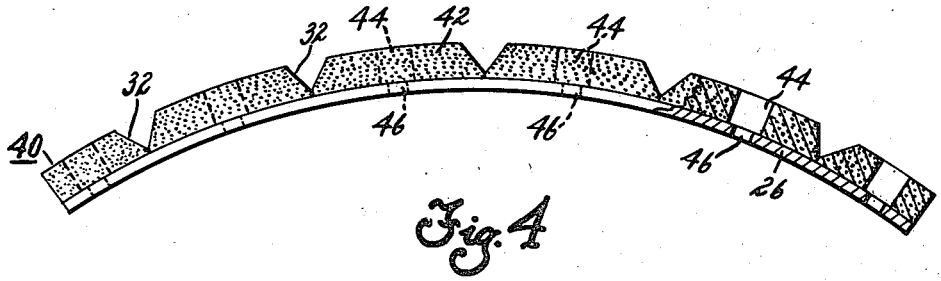
Figure 4 is a view of the finished element wherein the supporting backing member has been bent to arcuate form.

After the sintering is completed and the strip with the porous sintered layer thereon has been cooled under non-oxidizing conditions, it is ready for final forming which is carried out in a conventional die, not shown, to cause the backing strip 26 to assume an arcuate form as noted in Figure 4 wherein the finished element 40 is shown. In this arcuate form, the sintered friction layer 42 would actually be stretched unevenly with tremendous strains being imposed on the outer surface thereof were it not for the transverse grooves 32 which effectively divide the friction surface into a plurality of substantially disconnected short segments. In this manner, even though the friction material 42 is of a brittle nature, it does not tend to crack or break. In fact, any cracking that does occur will occur directly at the bases of the grooves 32. It is for this purpose that the grooves 32 preferably extend into close proximity with the steel backing member. After formation, the element 40 may have the friction surface thereof ground to exact contour or may be worn to contour in the specific brake or clutch that is to receive the element. It is also within the scope of the invention to drill the friction surface as at 44 and concentrically drill the steel backing as at 46 to provide countersunk points of attachment whereby rivets, bolts, etc., can be used to attach the element 40 to a brake or clutch mechanism.

It is within the scope of the invention to provide an external or internally lined band. In other words, the backing member 26 while shown in convex form with respect to the lining, could likewise be bent to concave form with respect to the lining. It is appreciated that in connection with ductile sintered materials the use of the segments is not as vital as with brittle materials although in all cases the segmental form of the lining reduces strains at the bonding surface and, thus, produces a more uniform lining from point of wear and operational characteristics.

While the embodiments of the present invention as herein disclosed constitute preferred forms, it is to be understood that other forms might be adopted.

What is claimed is as follows:

1. In a method for making a semi-cylindrical friction member comprising a sintered friction layer of a normally brittle material bonded to a strong metal backing member, the steps comprising; briquetting the layer of powdered material onto the surface of a relatively flat strong metal strip and simultaneously scoring the briquetted material laterally of the strip into a plurality of substantially disconnected segments, sintering the briquetted material on the surface of the strip under suitable conditions of time, temperature and atmosphere for causing the material to sinter together into a strong porous layer and to simultaneously bond coextensively to the surface of the strip, and finally forming the member into semi-cylindrical form by permanently deforming the strong metal strip.

2. The method as claimed in claim 1 together with the added step of grinding the surface of the sintered friction material after formation into concentricity with the backing strip.

3. The method as claimed in claim 1 together with the added step of preparing the surface of the strong metal backing member prior to briquetting the layer of powdered material thereon by the use of a flash coating of copper.

4. In the method for making a semi-cylindrical friction member comprising a sintered ferrous friction layer comprising a powdered mixture of iron-graphite, wherein the graphite is in the order of 20 to 24% by weight, which friction layer is bonded to a strong metal backing member, the steps comprising, briquetting a layer of said powdered mixture onto the surface of a relatively flat strong metal strip and simultaneously scoring the briquetted material laterally of the strip into a plurality of substantially disconnected segments, sintering the briquetted material onto the surface of the strip under pressure for a time and at a temperature sufficient to cause the powdered material to sinter together into a strong porous layer and to simultaneously bond coextensively onto the surface of the strip, and finally forming a member so formed into semi-cylindrical form for permanently deforming the metal strip.

5. The method as claimed in claim 4 with the added step of grinding the surface of the sintered ferrous friction layer after forming the member into semi-cylindrical form so that the friction surface and the backing surface are concentric.

6. In a method for making a semi-cylindrical friction member comprising a sintered friction layer made from powdered material comprising a major portion of metal powder bonded to a strong metal backing member, the steps comprising; briquetting the layer of powdered material onto the surface of a relatively flat strong metal strip and simultaneously scoring the briquetted material laterally of the strip into a plurality of substantially disconnected segments, sintering the briquetted material on the surface of the strip under suitable conditions of time, temperature and atmosphere for causing the material to sinter together into a strong porous layer and to simultaneously bond coextensively to the surface of the strip, and finally forming the member into semi-cylindrical form by permanently deforming the strong metal strip.

7. The method as claimed in claim 6 together with the added step of grinding the surface of the sintered friction material after formation into concentricity with the backing strip.

References Cited in the file of this patent
UNITED STATES PATENTS

| | | |
|---|---|---|
| 2,289,311 | Wellman | July 7, 1942 |
| 2,464,437 | Dasher | Mar. 15, 1949 |